United States Patent
Sexton et al.

(10) Patent No.: US 6,854,026 B1
(45) Date of Patent: Feb. 8, 2005

(54) METHODS AND SYSTEMS FOR INTERFACING SMALL DEVICES TO COMPUTER NETWORKS

(75) Inventors: Daniel W. Sexton, Charlottesville, VA (US); Andrew M. Lacy, Ruckersville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/518,993

(22) Filed: Mar. 3, 2000

Related U.S. Application Data

(60) Provisional application No. 60/173,586, filed on Dec. 29, 1999.

(51) Int. Cl.[7] ............................................. G06F 13/12
(52) U.S. Cl. ......................................... 710/62; 710/36
(58) Field of Search ............................. 710/1, 36, 62; 709/203, 206, 217, 219; 713/201; 345/760

(56) References Cited

U.S. PATENT DOCUMENTS

| | | | |
|---|---|---|---|
| 5,596,718 A | | 1/1997 | Boebert et al. ............. 713/201 |
| 5,715,453 A | * | 2/1998 | Stewart ...................... 715/513 |
| 5,742,845 A | | 4/1998 | Wagner ....................... 710/11 |
| 5,802,321 A | | 9/1998 | Buda et al. .................. 709/251 |
| 6,092,078 A | * | 7/2000 | Adolfsson .................... 707/102 |
| 6,161,140 A | * | 12/2000 | Moriya ........................ 709/228 |
| 6,199,130 B1 | | 3/2001 | Berglund et al. ........... 710/302 |
| 6,279,044 B1 | | 8/2001 | Niu et al. ........................ 710/5 |
| 6,289,388 B1 | | 9/2001 | Disney et al. .............. 709/238 |
| 6,330,611 B1 | * | 12/2001 | Itoh et al. ................... 709/229 |
| 6,643,650 B1 | * | 11/2003 | Slaughter et al. ............. 707/10 |

\* cited by examiner

*Primary Examiner*—Jeffrey Gaffin
*Assistant Examiner*—Harold Kim
(74) *Attorney, Agent, or Firm*—Eugene Hyun, Esq.; Armstrong Teasdale LLP

(57) ABSTRACT

In one aspect, the invention is a method for communicating with a device such as a programmable logic controller (PLC) or an I/O device. The method includes steps of: interconnecting the device to a personal computer (PC) running a web browser; and running an application on the PC that launches the web browser to an initial page and uploads a web browser applet or active x object from the device to the PC via the interconnection.

The above-described embodiment combines PLC and/or I/O communications with the Internet's wide reach and ability to supply information, and does so with the "look and feel" of a PC-Internet interface without adding significantly to the overhead burden of these small devices.

26 Claims, 1 Drawing Sheet

METHODS AND SYSTEMS FOR INTERFACING SMALL DEVICES TO COMPUTER NETWORKS

CROSS REFERENCE TO RELATED APPLICATIONS

This application claims the benefit of U.S. Provisional Application No. 60/173,586, filed Dec. 29, 1999, which is hereby incorporated by reference in its entirety.

BACKGROUND OF THE INVENTION

The present invention relates to programmable logic controllers (PLC) and I/O (input/output) product network interfacing methods, and more particularly to methods for interfacing such devices to larger computer networks, such as the Internet.

AL Small programmable logic controllers (PLCs) and I/O products are known that communicate to other PLCs via a host of specialized networks, or via dedicated ports to configuration and monitoring devices. These specialized networks and dedicated ports can be used to provide data and programming for the devices connected thereto. However, the reach of specialized networks is usually limited. The Internet provides global or nearly global coverage, and can be reached by literally millions of personal computers (PCs). Users have come to accept and understand the look and feel of Internet browsers, and have come to expect that all of the information they need to perform their work tasks are available to them via these browsers. Nevertheless, only rarely are small PLCs and I/O products connected to information networks such as Ethernet or Internet infrastructure networks, because such connections are too resource-costly. One known device communicates directly with the Internet using a web browser, and thus requires that the overhead associated with the Internet network interface and web browser be built into the device.

It would be advantageous to combine I/O and PLC communications with the Internet's wide reach and ability to supply information, and to do so without adding significantly to the overhead burden of these small devices. It would further be advantageous to provide the capability of providing users with the "look and feel" of a PC-Internet interface.

BRIEF SUMMARY OF THE INVENTION

There is therefore provided, in one embodiment of the present invention, a method for communicating with a device such as a programmable logic controller (PLC) or an I/O device, the method including steps of: interconnecting the device to a personal computer (PC) running a web browser; and running an application on the PC that launches the web browser to an initial page and uploads a web browser applet or active x object from the device to the PC via the interconnection.

The above-described embodiment combines PLC and/or I/O communications with the Internet's wide reach and ability to supply information, and does so with the "look and feel" of a PC-Internet interface without adding significantly to the overhead burden of these small devices.

DETAILED DESCRIPTION OF THE INVENTION

Figure 1:
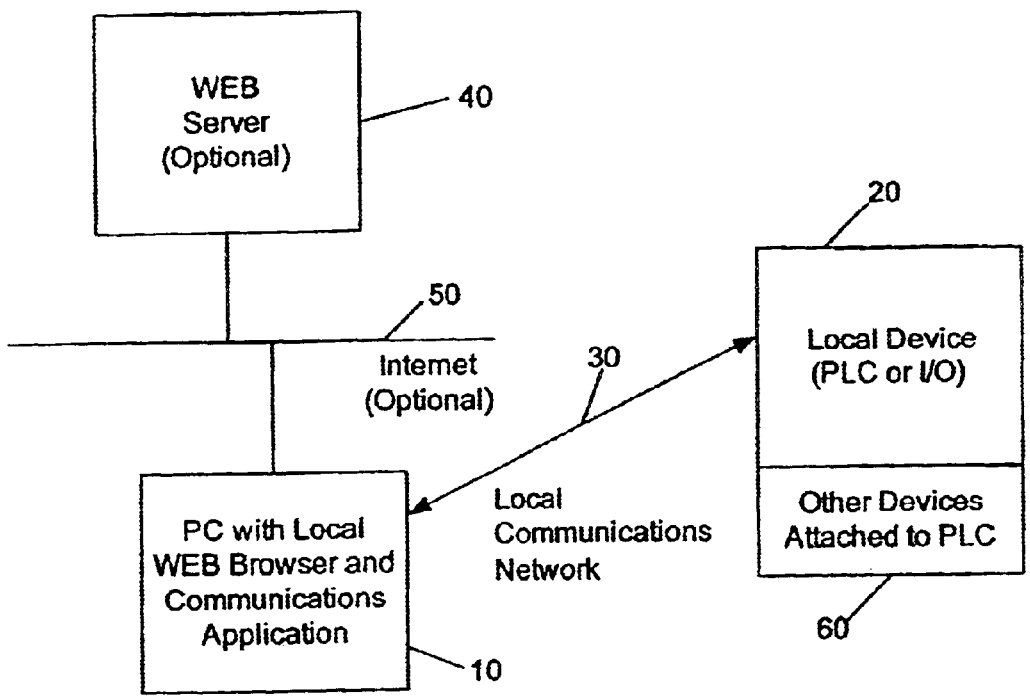
FIG. 1 is a block diagram of an exemplary interconnection of components suitable for practicing one embodiment of the present invention.

A block diagram of an exemplary interconnection of components suitable for practicing one embodiment of the present invention is shown in FIG. 1. A PC 10 is electronically linked to a PLC or I/O device 20 through an electronic link 30. The communication mechanism of link 30 is of any type, for example, a proprietary communications link or a standard network. PLC or I/O device 20 supplies PC 10 with code which PC 10 uses in conjunction with a standard web browser to retrieve information and run applications. For example, information is retrieved and applications are run from or through a web server 40 communicating with PC 10 via Internet 50, or the information and applications reside locally in PC 10. An applet or active x object loaded into the browser of PC 10 from PLC or I/O device 20 enables data to be retrieved and monitored from device 20, allows device 20 to request data and applications to be loaded from server 40 or locally for display at PC 10. Once loaded, the applet or active x object in PC 10 also allows server 40 to retrieve information from device 20 through PC 10 and allows server 40 to download information to device 20. In one embodiment, device 20 has other intelligent devices 60 connected to it and exchanging communication therewith, for example, a PLC 20 with multiple intelligent modules 60. Modules 60 also communicate through PLC 20 to PC 10 through link 30 and through the browser running on PC 10.

In one embodiment of the present invention, an application within PC 10 is triggered by a user. Triggering of the application establishes communication to device 20, initiates a standard web browser on PC 10, loads an applet or active x object and points the browser to an appropriate web page either stored locally on PC 10 or on web server 40 (if PC 10 is connected to Internet 50).

Device 20 does not directly communicate with Internet 50. Instead, the web browser that is launched on PC 10 and an applet or active x object provided by device 20 and uploaded to PC 10 provide what appears to a user as a bridge between device 20 and another network such as Internet 50, connecting device 20 and network such as Internet 50 through PC 10 and the browser. Once communication between PC 10 and device 20 is established by an application started by the user on PC 10, for example, a web browser that supports applets or active x objects takes over and provides additional functionality. In particular, additional information, programs, and applications are fetched as needed either locally on PC 10 or over Internet 50. Thus, local device 20 appears to the user as a web-enabled product, without the cost and overhead of providing an actual web connection to the device.

In one embodiment, for example, information about device 20, such as a data sheet, application information, current or latest firmware revision, configuration, or programming software, is automatically received when device 20 is connected as shown in FIG. 1. The information is compared to information stored in server (40) to verify correct or latest revision is in PLC (20).

In another embodiment, communication is provided between PC 10 and programmable logic controller (PLC) or 10 device 20. Communication is accomplished by electrically interconnecting the device to a personal computer (PC) 10; and running an application on PC 10 that launches a web browser to an initial page and uploads a web browser applet or active x object from device 20 to PC 10 via the interconnection. The initial page, for example, is one stored on PC 10 itself or on server 40 connected to PC 10 by a network, such as Internet 50. (An initial page from device 20 to PC 10 could also be uploaded along with the web browser applet or active x object, and it is not meant to exclude embodiments that do so.) In one embodiment, data is communicated or exchanged between PC 10 and device 20, under control of the web browser and web browser applet or active x object. In an embodiment in which PC 10 is in communication with server 40 on network, such as Internet 50 and in which the interconnection between device 10 and personal computer 20 is separate from network, such as Internet 50, PC 10 automatically retrieves data specified by the web browser applet or active x object from server 40 via network, such as Internet 50. For example, data relating to device 20 is retrieved and displayed in a window of the web browser, data comprising an executable application is received from PC 10 and the executable application is executed by device 20 after downloading, or data received from server 40 is downloaded to the device. In one embodiment, data transfer from device 20 to server 40 occurs via the web browser. ("Via the web browser" should be construed as including transfers aided by the web browser applet or active x object.) In yet another embodiment, rather than automatically retrieving data from server 40, data is retrieved from that which is locally stored on PC 20.

In one embodiment in which device 20 is electronically coupled to a plurality of intelligent modules 60, selective communication of data between intelligent modules 60 and server 40 occurs, via device 20, the interconnection, the web browser, and the web browser applet or active x object.

Although in several embodiments described herein, data is transferred between server 40 on network, such as Internet 50, and the web browser running on PC 10 and/or device 20, in other embodiments, no server is required or utilized. In these other embodiments, data is transferred between PC 10 itself (e.g., local storage on PC 10) and the PC web browser and/or device 20.

It will be recognized that the embodiments of the present invention disclosed herein combine I/O and PLC communications with the Internet's wide reach and ability to supply information, and do so without adding significantly to the overhead burden of these small devices. Furthermore, the "look and feel" of a PC-Internet interface is provided.

Although the present invention has been described in detail by reference to various specific embodiments, it will be understood that various modifications of the embodiments described herein are possible without departing from the scope and spirit of the invention. Accordingly, the spirit and scope of the invention are to be limited only by the terms of the appended claims and their equivalents.

What is claimed is:

1. A method for communicating with a device including one of a programmable logic controller (PLC) and an input/output (I/O) device, said method comprising the steps of:
   interconnecting the device to a personal computer (PC) running a web browser, wherein said interconnecting includes connecting the device to the PC via a connection outside a network connecting the PC to a server; and
   running an application on the PC that launches the web browser to an initial page and uploads a web browser applet or active x object from the device to the PC via the interconnection.

2. A method in accordance with claim 1 further comprising the step of electronically communicating data between the PC and the device, under control of the web browser and web browser applet or active x object.

3. A method in accordance with claim 1 further comprising the step of the PC automatically retrieving data specified by the web browser applet or active x object from the server on the network.

4. A method in accordance with claim 3 wherein the data retrieved from the server on the network comprises information about the device.

5. A method in accordance with claim 4 further comprising the step of displaying the information about the device in a web browser window.

6. A method in accordance wit h claim 3 wherein the data retrieved from the server on the network comprises an executable application, and further comprising the step of executing the executable application.

7. A method in accordance with claim 3 further comprising the step of downloading the data received from the server to the device.

8. A method in accordance with claim 3 further comprising the step of transferring data from the device to the server via the web browser.

9. A method in accordance with claim 3 wherein the device is electronically coupled to a plurality of intelligent modules, and further comprising the step of selectively communicating data between the intelligent modules and the server, via the device, the interconnection, the web browser, and the web browser applet or active x object.

10. A method in accordance with claim 1 and further comprising the step of automatically retrieving data specified by the web browser applet or active x object from the PC to the device.

11. A method in accordance with claim 1 further comprising the step of transferring data from the device to the PC via the web browser.

12. A method in accordance with claim 1 wherein the device is electronically coupled to a plurality of intelligent modules, and further comprising the step of selectively communicating data between the intelligent modules and the PC, via the device, the interconnection, the web browser, and the web browser applet or active x object.

13. A system configured to allow indirect communication with a network, said system comprising:
   a computer;
   a device without a network interface and including a web browser applet or active x object, said device including one of a programmable logic controller (PLC) and an input/output (I/O) device; and
   an interconnection between said computer and said device,
   said computer configured with an interface to the network, a web browser, and an application that launches the web browser to an initial page and uploads the web browser applet or active x object from the device to the computer via said interconnection.

14. A system in accordance with claim 13 wherein the web browser and web browser applet or active x object are configured to control electronic data communication between said computer and said device.

15. A system in accordance with claim 13 wherein said computer configured to communicate with a server on the network, wherein said interconnection between said device and said computer is separate from the network.

16. A system in accordance with claim 15 wherein said computer further configured to automatically retrieve data specified by the web browser applet or active x object from the server on the network.

17. A system in accordance with claim 16 wherein the data retrieved from the server on the network comprises information about said device.

18. A system in accordance with claim 17 wherein said computer configured to display the information about said device in a web browser window.

19. A system in accordance with claim 16 wherein the data retrieved from the server on the network comprises an executable application, said computer configured to execute the executable application.

20. A system in accordance with claim 16 wherein said computer configured to download the data received from the server to said device.

21. A system in accordance with claim 16 wherein said computer configured to transfer data from said device to the server via the web browser.

22. A system in accordance with claim 16 wherein said device configured to be electronically coupled to a plurality of intelligent modules, said computer configured to selectively communicate data between the intelligent modules and the server, via said device, said interconnection, the web browser, and the web browser applet or active x object.

23. A system in accordance with claim 13 wherein said computer configured to automatically transfer data specified by the web browser applet or active x object from said computer to said device.

24. A system in accordance with claim 13 wherein said computer configured to transfer data from said device to said computer via the web browser.

25. A system in accordance with claim 13 wherein said device is electronically coupled to a plurality of intelligent modules, said device configured to selectively communicate data between the intelligent modules and said computer, via said device, said interconnection, the web browser, and the web browser applet or active x object.

26. A system in accordance with claim 13 wherein the network is the Internet.

\* \* \* \* \*